Figure 3:
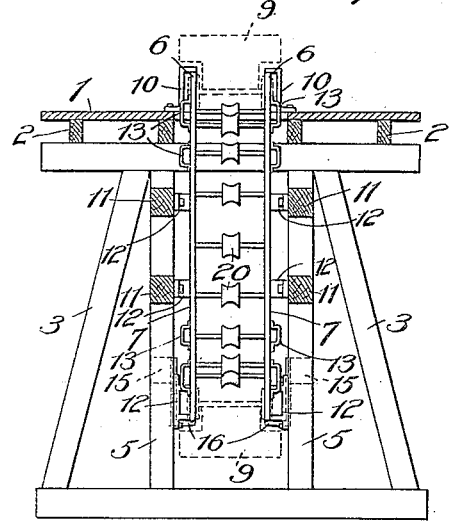

No. 816,736. PATENTED APR. 3, 1906.
H. M. RAMSEUR.
CAR DUMP.
APPLICATION FILED JULY 13, 1905.
2 SHEETS—SHEET 1.
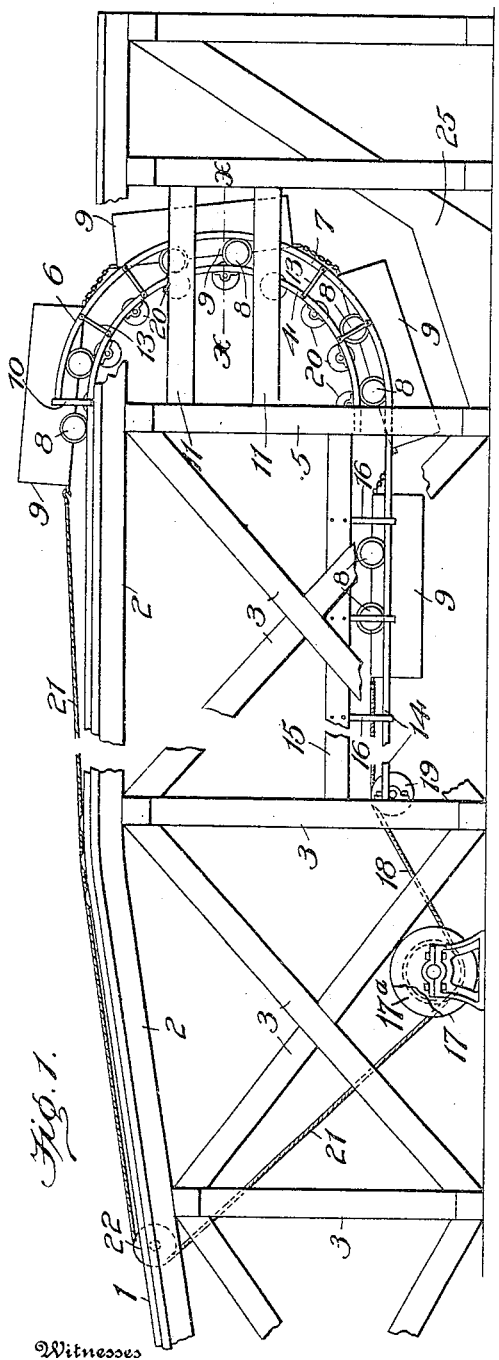
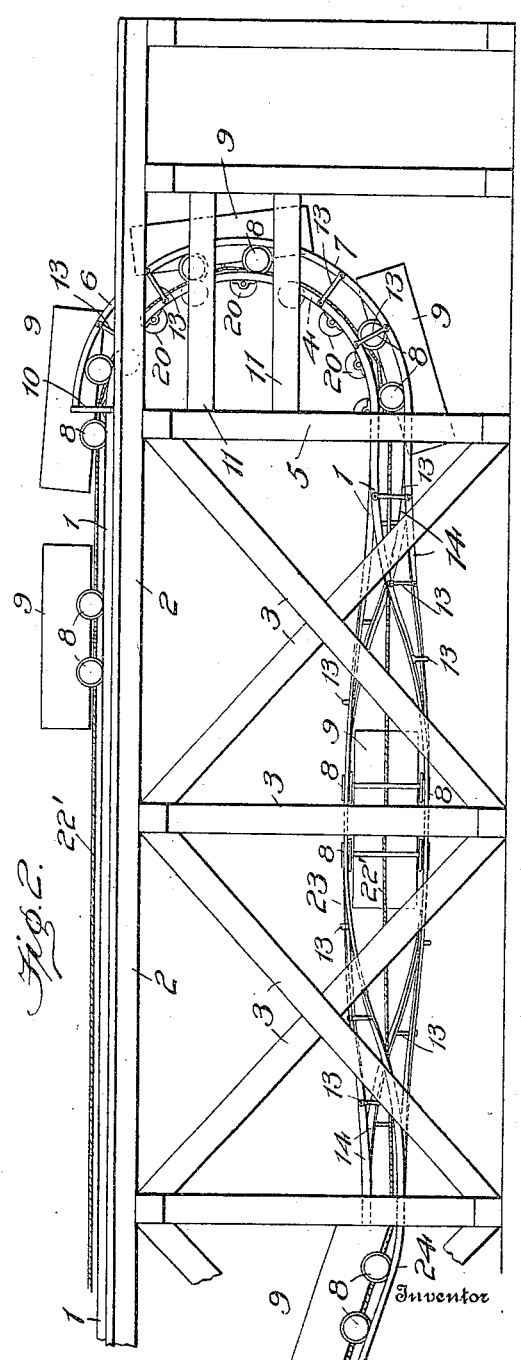
Witnesses
Edwin L. Bradford
P. H. Burch
Inventor
Harvey M. Ramseur
By R. D. Johnston Jr.
Attorney No. 816,736. PATENTED APR. 3, 1906.
H. M. RAMSEUR.
CAR DUMP.
APPLICATION FILED JULY 13, 1905.

2 SHEETS—SHEET 2.

Witnesses
Edwin L. Bradford
P. H. Burch

Inventor
Harvey M. Ramseur

By
Robt. D. Johnston Jr.
Attorney

UNITED STATES PATENT OFFICE.

HARVEY M. RAMSEUR, OF BIRMINGHAM, ALABAMA.

CAR-DUMP.

No. 816,736.  Specification of Letters Patent.  Patented April 3, 1906.

Application filed July 13, 1905. Serial No. 269,535.

*To all whom it may concern:*

Be it known that I, HARVEY M. RAMSEUR, a citizen of the United States, residing at Birmingham, in the county of Jefferson and State of Alabama, have invented new and useful Improvements in Car-Dumps, of which the following is a specification.

My invention relates to improvements in car-dumps, and has for its object to dispense with all movable parts and invert the car by passing it around a curved track.

In the art to which my invention pertains it is important that the cars after being dumped should be in a position to be readily and rapidly returned to service with a minimum expenditure of time and power in the handling of empties. The dump should also be convertible for use with a single or an endless cable to make it generally serviceable.

One object of my invention is to provide a dump comprising a stationary track bent downwardly in a single curve and provided with an outer curved guard-rail upon which the wheels of the car run after it passes a certain point in the curve. This curved track continues any desired distance beyond the curve and under the track overhead, so that any desired number of cars may be run around the curved track, as a train, and dumped. To return the cars when handled by a tail rope or cable, I propose to draw them back up around the curved track, and with this object in view I place a plurality of rollers or pulleys around the curved track, disposed at suitable points to catch the cable as the car or cars run around the curve and enable them to be drawn back around the curve and back up the main track with comparatively small power. This dumping apparatus is simple, durable, requires no moving parts for either car or dump, and dispenses with all return trackage for the empties, which are lowered but a comparatively small distance below the main track by the single curve of the dump.

It is a further object to adapt my invention for use with an endless cable system and as a convertible dump, and to this end I form a half spiral in the lower track, which either rights the cars as they are drawn around it after being inverted and dumped in their passage around the curve, or which first dumps the cars, after which they are righted by being drawn up around the curve. The guard-rail around the curve continues around the half-spiral, the rails being so arranged that they support the cars when disposed with their ends uppermost on the flanges of the wheels. As the cars are comparatively light when empty, this turning of the half-spiral can be effected with but little friction and without interrupting the steady travel of the cars and cable, which can thus continue without attention as long as desired. This convertible dump is of considerable importance, as it will enable the cars to discharge their contents at different levels. Thus if the coal is soft and easily broken up the cars will be dumped by the half-spiral, which need be but little above the railway-cars, whereas, if the coal be hard, it can be dumped by the curve. This feature of my invention makes it more adaptable to different kinds of mining and to various local conditions at the point of dumping, such as the elevations and relative positions of the mine and railroad.

My invention further comprises the details of construction and arrangement of parts hereinafter more particularly described and claimed, reference being had to the accompanying drawings, in which—

Figure 4:
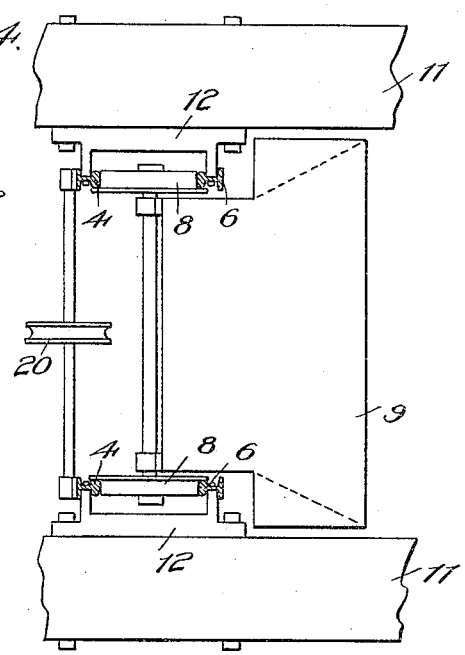
Figure 5:
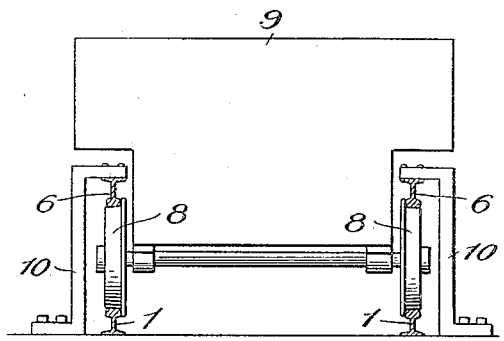
Figure 6:
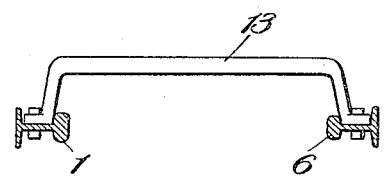

Figure 1 is a side elevation of my improved dump as used for a single or tail rope system. Fig. 2 is a similar view of the convertible dump with the half spiral for inverting or righting the inverted cars where an endless cable system is used. Fig. 3 is an end view of Fig. 2. Fig. 4 is a sectional view along the line $x \, x$, Fig. 1. Fig. 5 illustrates the manner of supporting the curved guide-rails. Fig. 6 illustrates a brace to connect the rails of the curve and spiral.

Similar reference-numerals refer to similar parts throughout the drawings.

The track along which the car or cars are moved by the hoisting apparatus comprises the rails 1, suitably mounted on stringers 2, which are supported near the tipple on trestle-work 3. The rails 1 are curved downwardly to form the substantially semicircular curve 4 and are connected at their lower ends to a post 5 of the trestle-work. At the beginning of the curved track 1 I provide guard-rails 6, which have their treads inwardly disposed and form an outer curved track 7 equidistant from the curve 4 and spaced therefrom sufficiently to enable the wheels 8 of the cars 9 to pass between them without binding. Angle-irons 10 support the upper ends of the rails 6, which, with the rails 1, are supported around the curve by the cross-braces 11, to which they are connected in the manner shown in Fig. 4 by spacer-cleats 12. These cleats support the rails so that the wheel-hubs will clear the braces and also the post 5, where a similar cleat is used. To brace the oppositely-disposed rails 1 and 6 together, I provide yokes 13, Fig. 6, which are so designed as to avoid interference with the wheel-hubs. The guard-rails 6 continue beyond the curve 7 to form a track 14 sufficient in length to accommodate any desired number of cars, which, it will be noted, are in their inverted position and with their body portions disposed between these rails. A stringer 15 for this lower track continues to the rear of the trestle-work above the rails 6, which are supported therefrom by irons 16, provided with angled end portions which support the rails while permitting the car-body to be suspended between them. These supporting-irons may be braced laterally in any desired manner. The braces 11 extend beyond the curved portion of the track and are there connected to front posts of the trestle-work in the manner best adapted to brace and strengthen the dumping curved portion of the tracks. Any desired number of them may be used, and, if desired, the rails 1 may be braced together by cross-ties around the curve, around which the stringers 2 may be extended.

The apparatus for hoisting and dumping the cars, as shown in Fig. 1, comprises hoisting-drums 17 17$^a$, driven by any suitable machinery and independently controllable. From the main drum 17 the hoisting-cable 18 passes over a pulley 19, mounted on the trestle-work near the inner end of the track 14 and around a plurality of similar rollers or pulleys 20, disposed around the track-curve and supported from the rails 1 or the braces 11 or in any other desired manner. These antifriction devices are placed the desired distance apart and are adapted to receive the cable 18 as it passes around the curve and continues into the mine, where it connects to the cars and draws them to the dump.

I provide a dumping-cable 21, controlled by the drum 17$^a$ and leading up to and around a pulley 22, disposed at any desired point on the tipple, but preferably near the knuckle of the track 1. This cable is provided with a hook or engaging means at its end, whereby it is connected to the opposite end of the car or train from the cable 18. The cable 21 is paid out until the car or cars reach the curve, when it is used to lower them around the same, the cable 18 being taken up on its drum. As the cars run around the curve the rollers 20 catch the cable 21, so that when it is desired to return the empty cars, supported in inverted position on the track 14, to the main track 1 this can be easily and promptly done by applying power to wind cable 21 on its drum and draw them back up around the curve. The rollers 20 will take up the friction of the cable in passing around the curve, so that the empties, which are comparatively light, can be drawn back up around the curve with but little power, and it will be evident that they will be righted thereby and in a position to be lowered into the mine by the cable 18. The only manual labor required in dumping cars in this manner is that requisite to attach the dumping-cable to the rear end of the cars, which can be done while they are being weighed.

In adapting my invention for use with an endless cable 22', as shown in Fig. 2, the lower track 14 is twisted in a half-spiral at 23, the main rails 1 continuing beyond post 5 and being twisted in a half-spiral corresponding with the rails 6 and continuing on as the track 24 to the mines. The half-spiral bending of the track 14 brings its rails 6 to a position above the rails 1 at the left-hand end of the half-spiral portion, whereas they constitute the car-supporting rails at the other end thereof. As the wheels of the cars follow the half-spiral curvature of the tracks, the car-body is gradually turned sidewise and inverted from the position in which it entered the half-spiral. Throughout the spiral portion 23 of the tracks the rails may be braced together by yokes 13 and supported by the trestle-work in a manner to hold them firmly in position without interfering with the passage of the car-body between the rails 6 as it inverts or rights itself. According to this construction it will be evident that the cars, which may be connected to the endless cable 22' in any desired manner, may be passed in either direction around the curve and half-spiral. As the cars pass first around the curve their contents are dumped from a higher elevation than is the case where the cars are passed through the half-spiral. In either case the cars will automatically right themselves as they return to the main tracks 1 or 24 without requiring any manual attention or interrupting the continuous dumping of their contents. The chutes for the coal and ore are not shown in Fig. 2; but these will be provided in any suitable manner, so as to catch the contents of the cars whether dumped from the curve or half-spiral and discharge the same into the railway-cars or other desired point. The cable 22' may be driven by any suitable hoisting machinery, such as is in common use for this purpose.

The cars may be passed around the dump singly or in trains, and in the case where the twisting of the endless cable due to the turning of the cars in the half-spiral may prove troublesome any suitable slip connection may be provided between the cars and the cable to prevent the latter being twisted.

The general construction of my invention may be variously modified without departing from its principles and without limitation thereto.

What I desire to claim as new and protect by Letters Patent is—

1. In a car-dumping apparatus, the combination with hoisting machinery and a cable driven thereby, of a plurality of independent cars adapted to be coupled together and detachably connected to said cable, a track for said cars comprising rails in different horizontal planes, a vertical curve connecting said rails in different planes and comprising double rails, and antifriction-pulleys for supporting said cable as it rounds said curve, said cars being adapted to be lowered and raised by said cable around said curve, for the purposes described.

2. A car-dumping apparatus comprising upper and lower tracks, a curve connecting said tracks and comprising double rails, the inner rails forming a continuance of the upper track and the outer rails forming a continuance of the lower track, independent cars adapted to be detachably coupled in trains and passed around said curve for the purpose of dumping their contents, a hoisting-drum, a cable driven thereby and detachably connected to one of a train of said cars for the purpose of raising or lowering them around said curve, and antifriction devices on which said cable rests in rounding said curve.

3. The combination of two tracks in different planes, a substantially vertical curve connecting said tracks, cars adapted to pass around said curve and be inverted thereby, a plurality of hoisting-drums, a cable connected to one drum and adapted to pass around said curve to draw said cars to the dump, a second cable and drum adapted to lower said cars around said curve and draw them back up around it, and antifriction devices around said curve on which said cables run in rounding said curve.

4. In a car-dumping apparatus, a track which is curved downwardly to invert a car running thereon, and which is curved in a spiral manner to right the car, substantially as described.

5. In a car-dumping apparatus, a track which is curved downwardly to invert a car running thereon, and which is curved in a spiral manner to right the car, and means to guide said car around said curve and spiral, substantially as described.

6. In a car-dumping apparatus, a track for a car which leads downwardly around a substantially semicircular curve and is then twisted in a half-spiral causing a car which has been inverted by passing around the curve or half-spiral to be righted as it continues around the half-spiral or curve, in combination with dumping-cars having wheels running on said track, and means to move said cars around said curve and half-spiral, substantially as described.

7. In a car-dumping apparatus, a car-track, the rails of which are bent downwardly in a curve, guard-rails beginning at said curve and continuing around the same and beyond to form a lower track, on which the cars, inverted in traversing said curve, are supported, and stationary means to right said cars as they traverse this lower track after leaving said curve.

8. In a car-dumping apparatus, an upper and a lower track leading from the same side toward a downwardly-disposed curve connecting said tracks, the rails of the lower track being disposed in a spiral manner to cause a car in traversing said spiral to become inverted, a flexible rope or chain for drawing cars around said curve and spiral, and antifriction-supports for said rope or chain while passing around said curve, substantially as described.

9. In a car-dumping apparatus, a double track having oppositely-arranged rails disposed tread to tread and twisted in a half-spiral curve, a car having wheels adapted to run on one or the other of said tracks in passing around said half-spiral, means to draw said car through said half-spiral to invert it, and means to right and return the empty car, substantially as described.

10. In a car-dumping apparatus, a dumping-track comprising a half-spiral and a curve, an endless cable or rope passing around said curve and through said half-spiral, antifriction supporting means for said cable or rope, and dumping-cars detachably connected to said cable and adapted to be drawn through said half-spiral and around the curve for the purpose of dumping and righting them, substantially as described.

11. In a convertible dumping apparatus, a continuous track comprising car dumping and righting portions, rails forming double tracks around said dumping and righting portions and which are so arranged that a car makes two half-turns on longitudinal and transverse axes in passing around said portions, and means to pass the cars in either direction around said continuous track, whereby they are dumped and automatically righted, substantially as described.

12. In a convertible dumping apparatus, a continuous track, portions of which are in different planes, double rails forming a portion of said track and arranged to invert a car running over them, double rails connecting the portions of the track in different planes which are so disposed as to invert a car in passing from one plane to the other, and means to pass the cars in either direction around said continuous track, for the purposes described.

13. A dumping apparatus comprising a main track, a lower track, a downwardly-disposed curve connecting said tracks, cars adapted to be detachably coupled in trains and to move on said tracks, in combination with operating mechanism for the cars comprising one cable for drawing the cars to a point where they can be lowered around the curve and a second cable for lowering and raising the cars back up around said curve to the main track, machinery for driving said cables, and antifriction devices to reduce the wear on the cables in rounding the dumping-curve.

14. Dumping mechanism for independent cars adapted to be detachably connected and handled in trains, which comprises a main track, a cable to move the loaded cars along said track to a point whence they will run by gravity to the dumping-point, driving means for said cable, a second cable adapted to be connected to the rear end of the train of cars, and driving machinery which controls, by said second cable, the lowering of said cars to the dumping-point, and dumping means comprising downwardly-curved track devices which invert the cars as they pass around them, said latter cable acting both to lower and to raise the cars around said curve and return them to the main track, as and for the purposes described.

In testimony whereof I have hereunto set my hand in presence of two subscribing witnesses.

HARVEY M. RAMSEUR.

Witnesses:
 JNO. LEWIS,
 NOMIE WELSH.